UNITED STATES PATENT OFFICE 2,386,725

THERAPEUTIC SUBSTANCE FOR MEASLES

Lyon Peter Strean, Montreal, Quebec, Canada, assignor to Ayerst, McKenna & Harrison Limited, Montreal, Quebec, Canada, a corporation of Canada No Drawing. Application August 3, 1942, Serial No. 453,431. In Canada June 17, 1942

2 Claims. (Cl. 167—78)

Introduction

The present invention relates to a new therapeutic product useful in the treatment of measles and derived from human body substances and to an improved process of manufacturing such a product.

In obtaining products of this nature, there are three main factors to be considered, (1) the availability of the substances from which the products are to be derived, (2) the activity of the derivable substances, and (3) the absence in these products of factors which give undesirable effects in use.

The applicant has discovered that a product satisfying these criteria can be derived from human placental cord blood. This product is effective for immunizing against measles and as a skin test applied to the determination of susceptibility to this disease.

Objects

Having regard to the foregoing, objects of the invention are to provide an improved therapeutic agent; an improved agent derived from body substances and free from undesirably active constituents; an agent of the foregoing type having specific utility for the treatment of measles; an improved process for deriving such an agent.

Preparation

According to a preferred procedure for preparing the improved therapeutic product, the blood is removed by merely allowing it to run from the human placental cord or by drawing it out with a needle and syringe. The blood thus extracted is inherently suitable, being substantially free from tissue proteins for instance such as those found in placental extracts, which cause unfavourable reactions when injected into the human body. It contains the antibodies inherent in the original blood. The blood collected from a number of deliveries is allowed to clot and the separated serum pooled.

The blood itself may be employed for therapeutic purposes and injected into the human body after it has been citrated, oxalated or defibrinated. Alternatively, the serum, treated with a suitable preservative such as for example, sodium ethylmecurithiosalicylate may be employed or the cord blood may be converted into a plasma and similarly preserved before use. The applicant prefers, however, to proceed further in the isolation of the therapeutic principle.

According to such a procedure, the globulin fraction of the serum is precipitated by the use of a suitable agent, such as for example half saturated anhydrous sodium sulphate or other globulin precipitants among which are alcohol and ammonium sulphate. Non-essential elements such as albumin fractions are discarded, and salts, etc. are then suitably removed for instance, by dialysis, kaolin adsorption, heat treatment and filtration through filters of various porosities. In brief the substance is rendered effectively free from material unfavourably reactive when injected into the human body, without being deprived of its therapeutic value. The solution is then reconstituted to the desired concentration and tonicity.

In order to explain more specifically the preparation of the globulin according to the invention a particular example is given as follows. It will of course be understood that the data given is illustrative only and not to be taken in a limiting sense.

Example I

In the case room, soon after delivery of the child from non-syphilitic mothers (Wassermann negative), the blood is emptied from the placental end of the cord under aseptic conditions into sterile containers. The cord blood is then allowed to clot at about 4° C. and the separated serum is pooled and then filtered through a Seitz K pad and preservative (merthiolate about $1/10,000$) added. The globulin fraction from the serum is precipitated with half-saturated anhydrous sodium sulphate (analytical reagent). It is then filtered through hardened filter paper and the precipitate dialyzed against distilled water. The globulin solution is reconstituted to about half the original volume of serum, preservative is added (merthiolate about $1/10,000$) and then treated with kaolin over night at about 4° C. The following day the globulin solution is filtered through a Seitz E-K pad and nitrogen and sulphate determinations are made. The total nitrogen should not be over about 12 mg. per c. c. Adjustments are made with sodium chloride to render the globulin solution isotonic. The material is then tested for pyrogenic factors. When found satisfactory on this score, the globulin solution is filtered through a Jena 3 sintered glass filter and a bulk sterility test done. If the material is found to be sterile, aerobically and anaerobically according to the regulations of the National Institute of Health, and produces no toxic effects during a period of ten days after administration of a suitable dose to common laboratory animals, the globulin solution is then ampouled.

Sterility, toxicity, identity tests are performed on the ampouled material and when found satisfactory the globulin solution is considered ready for use.

In order to secure a uniformity of the product, the blood from a large number of cords is pooled into a single batch and the volume of successive batches of globulin adjusted to a constant nitrogen content. The therapeutic effectiveness of each batch is determined by clinical trial.

The processing of the crude serum globulin is an important step in the procedure and care must be exercised at that stage otherwise general reactions may follow injection of the material. The product resulting is a globulin fraction from human cord blood which is substantially free from other tissue extractives, substantially free from pyrogenic factors and an eminently suitable therapeutic agent. It contains the fraction of the blood useful in replenishing and maintaining the bloom volume in transfusions. The product also contains antibodies useful in the determination of immunity and treatment of measles.

It is well-known that individuals exposed to measles and possessing no immunity to the disease will develop a characteristic rash. If, however, about 0.1 c. c. of the cord globulin is injected intracutaneously before the onset of the rash, the rash is prevented from developing in this area and the injected area remains blanched for the duration of the rash. Thus a well-defined blanched area clearly demarcated measuring several centimeters in diameter is found surrounded by the exanthem. A skin test of this nature confirms the diagnosis of measles in cases in which the rash might be confused with other allergic rashes as are commonly found associated with sensitization to foreign proteins or chemotherapeutic agents. Since a second attack of measles is uncommon, it becomes of value to the patient to known that he has already recovered from the disease.

Clinical applications

When this agent is used for immunizing against measles, it is injected intramuscularly in suitable doses. Other routes may be used, such as for instance the subcutaneous or intravenous, but the intramuscular is preferred. If this material is to be used for transfusions, it is injected intravenously in desired amounts.

For immunizing purposes the dosage is related to a number of factors such as for instance, the age and physical condition of the patient, intimacy of exposure, presence or absence of clinical symptoms and interval between exposure and treatment.

Recommended dosage

For the treatment of measles—one intramuscular injection of about 5 c. c. or two intramuscular injections of about 2.5 c. c. each, at different sites, with a twenty-four hour interval between injections.

For the prophylaxis of measles—two intramuscular injections of about 2.5 c. c. each, at different sites, with about a forty-eight hour interval between injections.

The doses recommended above have been found to be sufficient to inhibit measles in most children exposed to the disease or to modify the symptoms greatly when it has already been acquired. In institutions housing many children or in large families, where it is desirable to stop an outbreak of the disease as early as possible, it is recommended that about 10 c. c. be administered preferably in two doses of about 5 c. c. each, at different sites, with about a twenty-four hour interval between injections.

Since the passive immunity conferred by administration of fully adequate doses of this product is of a temporary nature, it is often desirable, when the condition of the patient permits, to administer a dose insufficient to completely inhibit the development of the disease but sufficient to moderate the severity of the attack. The mild attack which the patient suffers, as a consequence, produces no serious ill-effects and may be expected to result in a permanent immunity to future attacks of the disease.

Since this product contains no substantial amount of foreign protein, local or general reactions following its administration are of a very minor character. It can thus be said to be effectively free from material unfavourably reactive when injected into the human body.

Advantages

A great advantage of this invention is that it renders possible the use of a source of the desired substance available in every city and town and makes use of material which normally goes to waste. According to the invention, this material may be salvaged and will repay many times the effort and expense involved in its collection.

It will be understood that, without departing from the spirit of the invention or the scope of the claims, various modifications may be made in the specific expedients described. The latter are illustrative only and not offered in a restricting sense, it being desired that only such limitations shall be placed thereon as may be required by the state of the prior art.

I claim:

1. A process of preparing a therapeutic agent effective against measles, comprising, drawing blood from human cords, obtaining a serum from said blood, treating said serum with a globulin precipitant selected from the group consisting of anhydrous sodium sulphate, ammonium sulphate and alcohol thereby to precipitate a globulin containing antibodies effective against measles, further treating the globulin fraction thereby to remove albumin fractions and salts whereby a substance is derived which is effectively free from material unfavourably reactive when injected into the human body, and adding thereto a suitable preservative.

2. A therapeutic agent effective against measles, comprising; a globulin fraction derived from human cord blood by drawing blood from human cords, obtaining a serum from said blood, fractionally precipitating said serum with a globulin precipitant selected from the group consisting of anhydrous sodium sulphate, ammonium sulphate and alcohol thereby to precipitate free from other tissue extracts a globulin fraction containing antibodies against measles, further treating the globulin fraction thereby to remove albumin and salts whereby a substance is derived which is effectively free from toxic or allergy producing material and a suitable preservative.

LYON P. STREAN.